US008560945B2

(12) United States Patent
Akiyama et al.

(10) Patent No.: US 8,560,945 B2
(45) Date of Patent: Oct. 15, 2013

(54) FILE EDITING APPARATUS, FILE EDITING METHOD AND FILE EDITING PROGRAM

(75) Inventors: Fumihito Akiyama, Yokohama (JP); Yoshinori Tanaka, Koganei (JP); Masahiro Ozawa, Hino (JP); Jun Kuroki, Sagamihara (JP); Hiroshi Nogawa, Hachioji (JP); Yasufumi Aoyama, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1228 days.

(21) Appl. No.: 12/398,661

(22) Filed: Mar. 5, 2009

(65) Prior Publication Data

US 2009/0225362 A1 Sep. 10, 2009

(30) Foreign Application Priority Data

Mar. 10, 2008 (JP) .................................. 2008-059263

(51) Int. Cl.
*G06F 17/00* (2006.01)
(52) U.S. Cl.
USPC .......... 715/276; 715/274; 715/273; 358/1.15; 358/1.16; 713/2
(58) Field of Classification Search
USPC .................. 715/276, 274; 358/1.13–1.15
See application file for complete search history.

(56) References Cited

U.S. PATENT DOCUMENTS

| | | | |
|---|---|---|---|
| 2007/0005845 A1* | 1/2007 | Abe | 710/62 |
| 2007/0136659 A1* | 6/2007 | Adelberg et al. | 715/513 |
| 2007/0216925 A1* | 9/2007 | Nakamura | 358/1.13 |
| 2008/0024802 A1* | 1/2008 | Kato | 358/1.9 |
| 2008/0151294 A1* | 6/2008 | Natori et al. | 358/1.15 |
| 2008/0158582 A1* | 7/2008 | Uotani | 358/1.13 |
| 2008/0313201 A1* | 12/2008 | Bishop | 707/101 |
| 2009/0086239 A1* | 4/2009 | Selvaraj | 358/1.13 |
| 2009/0161147 A1* | 6/2009 | Klave | 358/1.15 |
| 2009/0185214 A1* | 7/2009 | Bellert et al. | 358/1.15 |

FOREIGN PATENT DOCUMENTS

| | | |
|---|---|---|
| JP | 04-088749 | 3/1992 |
| JP | 2005-117622 | 4/2005 |
| JP | 2005-178074 | 7/2005 |
| JP | 2008-033812 | 2/2008 |

OTHER PUBLICATIONS

"XML Paper Specification," published by Microsoft Corporation, pp. i-xix and 1-433, (2006).

* cited by examiner

*Primary Examiner* — Cesar Paula
*Assistant Examiner* — Quoc A Tran
(74) *Attorney, Agent, or Firm* — Finnegan, Henderson, Farabow, Garrett & Dunner, L.L.P.

(57) ABSTRACT

There is described a file editing apparatus, a file editing method and a file editing program, each of which makes it possible not only for the user to edit an XPS file easily and conveniently, but also for plural users, respectively located at different sites, to issue instructions for editing the same XPS file from the different sites at a time. The apparatus includes: a receiving section to receive a print job; a parsing section to parse the print job, so as to read file editing instruction information attached to the print job; and a file editing section that decompresses an XPS file to edit the XPS file decompressed, and then, compresses the XPS file after editing, so as to create an edited XPS file. Accordingly, the apparatus also makes it possible to edit the XPS file, irrespective of the OS or the environment of the application program currently executed.

10 Claims, 10 Drawing Sheets

10: FILE EDITING SYSTEM

20: HOST APPARATUS
(FILE EDITING INSTRUCTION APPARATUS)

30: IMAGE FORMING APPARATUS
(FILE EDITING APPARATUS)

```
@PJL START
@PJL EDITMODE = CREATE
@PJL FILEPATH = ./box/XPS_Files/
@PJL FILENAME = Specificationxps

PAGE DATA

@PJL EOJ
```

FIG. 6 (b)

```
@PJL START
@PJL EDITMODE = DELETE
@PJL FILEPATH = ./box/XPS_Files/
@PJL FILENAME = Specificationxps
@PJL TARGETDOC = 1
@PJL TARGETPAGE = 2
@PJL EOJ
```

FIG. 6 (c)

```
@PJL START
@PJL EDITMODE = INSERT
@PJL FILEPATH = ./box/XPS_Files/
@PJL FILENAME = Specificationxps
@PJL TARGETDOC = 1
@PJL TARGETPAGE = 2

PAGE DATA

@PJL EOJ
```

FIG. 6 (d)

```
@PJL START
@PJL EDITMODE = OVERWRITE
@PJL FILEPATH = ./box/XPS_Files/
@PJL FILENAME = Specificationxps
@PJL TARGETDOC = 1
@PJL TARGETPAGE = 2

PAGE DATA

@PJL EOJ
```

```
<Fixed Document Sequence xmlrs="http://schemas.microsoft/com/xps/2005/06">
<Document Reference Source="Documents/1/Fixed Doc.fdoc"/>
<Document Reference Source="Documents/2/Fixed Doc.fdoc"/>
</Fixed Document Sequence>
```

FIG. 15

```
<Fixed Document Sequence xmlrs="http://schemas.microsoft com/xps/2005/06">
<Page Content Source="Documents/1/Pages/1.fpage"/>
<Page Content Source="Documents/1/Pages/2.fpage"/>
<Page Content Source="Documents/1/Pages/3.fpage"/>
</Fixed Document Sequence>
```

FIG. 16

```
<Fixed Page xmlrs="http://schemas.microsoft.com/xps/2005/06"Width="768"Hight="1092"xmllang="und">
    <Path Data="M 98.40, 118.72 L 664.96, 118.72 L 664.96, 345.44 L 98.40, 345.44 Z">
      <Path.Fill>
         <Image Brush Image Source="/Documents/1/Resources/Images/Img_1.jpg"Tile Mode="Tile"
            Viewbox="0,0,1280,512"Viewbox Units="Absolute"Viewport="0,0,1,1"Viewport Units="Absolute">
         </Image Brush>
      </Path.Fill>
    <Path>
    <Path Data="M 98.40, 345.44 L 664.96, 345.44 L 664.96, 572.00 L 98.40, 572.00 Z">
      <Path.Fill>
         <Image Brush Image Source="/Documents/1/Resources/Images/Img_2.jpg"Tile Mode="Tile"
            Viewbox="0,0,1280,512"Viewbox Units="Absolute"Viewport="0,0,1,1"'Viewport Units="Absolute">
         </Image Brush>
      </Path.Fill>
    </Path>
</Fixed Page>
```

FIG. 17

```
<?>ml version="1.0" encoding="UTF-8"Standalone="yes"?>
<Relationships xmlrs="http://schemasopen>m1formals.org/package/2006/relationshops">
<Relationships Id=rld1"Type"="http://schemasmicrosoftcom/>xps/2006/06/required-resource
"Taget="Documents/1/Resources/Images/Img.1jpg"/>
<Relationships Id=rld2"Type"="http://schemasmicrosoftcom/>xps/2006/06/required-resource
"Taget="Documents/1/Resources/Images/Img.2jpg"/>
<Relationships>
```

FILE EDITING APPARATUS, FILE EDITING METHOD AND FILE EDITING PROGRAM

This application is based on Japanese Patent Application No. 2008-059263 filed on Mar. 10, 2008, with Japan Patent Office, the entire content of which is hereby incorporated by reference.

BACKGROUND OF THE INVENTION

The present invention relates to a file editing apparatus, a file editing method and a file editing program, and specifically relates to such a file editing apparatus, a file editing method and a file editing program, each of which is to be employed for editing the XPS (XML Paper Specification) file.

In recent years, there have been increasingly proliferated in the market various kinds of printing apparatuses, such as a printer, a digital multi-functional apparatus, etc., (hereinafter, referred to as an image forming apparatus as a general term for each of them). When the image forming apparatus is employed as the network printer to implement the printing operation, at first, the concerned document is created by using the application program installed in advance in the host apparatus coupled to the network, and then, the created document is converted to the print data in the format of the Page Description Language (hereinafter, also referred to as the PDL, for simplicity) by employing the printer driver installed in advance in the host apparatus. Successively, the host apparatus transmits the concerned print data to the image forming apparatus through the network, while the image forming apparatus parses the received print data to implement the printing operations.

It is already known an application program for creating a document is such the application program that is operated on the basis of a standard called the XPS for describing the document in the form of the XML (Extensible Markup Language). Further, a document file created on the basis of the XPS (hereinafter, referred to as an XPS file) is possible to be printed without converting the file into the PDL print data (direct printing). Accordingly, in recent years, such the image forming apparatuses that can also handle the XPS file have been provided in the market. In this connection, the details of the XPS are disclosed in the "XML Paper Specification Version 1.0" being available on the web site (http://www.microsoft.com/whdc/xps/xpsspec.mspx).

When the user intends to change the contents of the document to be printed in the abovementioned printing mode, it is necessary for the user to edit the document file by using the application program installed in the host apparatus. However, since the XPS is established on the premise that the document, which is once created on the XPS, will not be edited again, none of the editing tools, such as an application program for editing the XPS file, etc., are provided from the Microsoft (Registered Trade Mark) that has originally drawn up the specification of the XPS or each of the ISVs (Independent Software Vendor). Accordingly, there has been a problem that it is impossible for the user to implement the operation for editing the XPS file.

Further, even if a kind of editing tool were available, the XPS file should be edited at the host apparatus side. For this reason, in order to edit the XPS file stored in the image forming apparatus, etc., which is located outside the host apparatus, the user should download the concerned XPS file into the host apparatus from the image forming apparatus. Then, after the operations for editing the XPS file are completed by using the editing tool, it is again necessary for the user to upload the edited XPS file into the image forming apparatus concerned. Therefore, there has been a problem that it is virtually impossible for the user to edit the XPS file easily and conveniently.

Accordingly, in the abovementioned editing mode in which the XPS file should be downloaded into the host apparatus from the image forming apparatus, since it is impossible for plural operators to edit a single XPS file at a time, the modified parts, which are respectively edited by the plural operators, should be put together at the final stage of the editing operation, or the plural operators should sequentially perform the editing operations of the respectively allotted parts one operator to another operator. Therefore, even in the abovementioned case, there has been another problem that it is virtually impossible for the plural operators to edit the XPS file easily and conveniently as a whole.

SUMMARY

To overcome the abovementioned drawbacks in conventional image forming apparatus, it is one of objects of the present invention to provide a file editing apparatus, a file editing method and a file editing program, each of which makes it possible for the user to edit an XPS file easily and conveniently.

Accordingly, at least one of the objects of the present invention can be attained by any one of the file editing apparatuses, the file editing method and the computer readable storage medium, described as follows.

(1) According to a file editing apparatus reflecting an aspect of the present invention, the file editing apparatus, comprises: a receiving section to receive a print job; a parsing section to parse the print job, received by the receiving section, so as to read file editing instruction information attached to the print job; and a file editing section that decompresses an XPS file, serving as a currently editing object, to edit the XPS file decompressed, and then, compresses the XPS file after editing, so as to create an edited XPS file.

(2) According to another aspect of the present invention, in the file editing apparatus recited in item 1, the file editing section is provided with, a first function that includes: correlating the print job with Fixed Document or Fixed Page of the XPS file; creating first elements being necessary for editing the XPS file; and designating a single first relationship or plural first relationships between the first elements created, when conducting a creation, an insertion or an overwriting of a document; a second function that includes: shifting a number of the Fixed Document or the Fixed Page; adding all of the first elements created under the Fixed Document or the Fixed Page, thereto; and registering the Fixed Document or the Fixed Page added with the first elements into a predetermined area, when conducting the insertion of the document concerned; and a third function that includes: deleting all of second elements currently set under the Fixed Document or the Fixed Page and second relationships between the second elements; adding all of the first elements created under the Fixed Document or the Fixed Page, thereto; and registering the Fixed Document or the Fixed Page added with the first elements into the predetermined area, when conducting the overwriting of the document concerned.

(3) According to still another aspect of the present invention, in the file editing apparatus recited in item 2, when conducting the creation of the document, the first function further includes: correlating the print job with the Fixed Document of the XPS file; creating all of third elements to be set under Fixed Document Sequence; and designating third relationships between the third elements; and when conducting the insertion or the overwriting of the document and when the Fixed Page is not designated, the first function further includes: correlating the print job with the Fixed Document of the XPS file; creating all of fourth elements to be set under Fixed Document; and designating fourth relationships between the fourth elements created; and when conducting the insertion or the overwriting of the document and when the Fixed Page is designated, the first function further includes: correlating the print job with the Fixed Page of the XPS file; creating all of fifth elements to be set under Fixed Page; and designating fifth relationships between the fifth elements created.

(4) According to still another aspect of the present invention, in the file editing apparatus recited in item 2, when conducting the insertion of the document and when the Fixed Page is not designated, the third function further includes: shifting each of document numbers of Fixed Documents, assigned just after other Fixed Documents to be inserted, by a number of the other Fixed Documents; adding all of sixth elements to be set under the other Fixed Documents, thereto; and registering the other Fixed Documents added with the sixth elements into the predetermined area; and when conducting the overwriting of the document and when the Fixed Page is not designated, the third function further includes: deleting all of the second elements currently set under the Fixed Document and second relationships between the second elements; adding all of the first elements created under the Fixed Document, thereto; and registering the Fixed Document added with the first elements into the predetermined area; and when conducting the insertion of the document and when the Fixed Page is designated, the third function further includes: shifting each of page numbers of Fixed Pages, assigned just after other Fixed Pages to be inserted, by a number of the other Fixed Pages; adding all of seventh elements to be set under the other Fixed Pages, thereto; and registering the other Fixed Pages added with the seventh elements into the predetermined area; and when conducting the overwriting of the document and when the Fixed Page is designated, the third function further includes: deleting all of the second elements currently set under the Fixed Page and the second relationships between the second elements; adding all of the first elements created under the Fixed Page, thereto; and registering the Fixed Page added with the first elements into the predetermined area.

(5) According to still another aspect of the present invention, in the file editing apparatus recited in item 1, the file editing instruction information is described in a Printer Job Language.

(6) According to a file editing method reflecting still another aspect of the present invention, the file editing method to be employed in a system, which includes a first apparatus that edits an XPS file and a second apparatus that instructs the first apparatus to edit the XPS file, comprises: transmitting a print job attached with file editing instruction information from the second apparatus to the first apparatus; parsing the print job, received from the second apparatus, in the first apparatus, so as to reads the file editing instruction information attached to the print job; and decompressing an XPS file, serving as a currently editing object, to edit the XPS file decompressed, and then, compressing the XPS file after editing, so as to create an edited XPS file in the first apparatus.

(7) According to a computer readable storage medium reflecting yet another aspect of the present invention, the computer readable storage medium stores a computer executable program to be executed in an apparatus for editing an XPS file, the program being executable by a computer to cause the computer to perform a process comprising: parsing the print job, received by the apparatus, so as to read file editing instruction information attached to the print job; decompressing an XPS file, serving as a currently editing object, to edit the XPS file decompressed; and compressing the XPS file after editing, so as to create an edited XPS file.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 6($a$), FIG. 6($b$), FIG. 6($c$) and FIG. 6($d$) show concrete examples of various print jobs attached with file editing identifiers, embodied in the present invention;

FIG. 14 shows exemplified descriptions indicating Fixed Document Sequence;

FIG. 15 shows exemplified descriptions indicating Fixed Document;

FIG. 16 shows exemplified descriptions indicating Fixed Page; and

FIG. 17 shows exemplified descriptions indicating Relationship (with respect to an objective Fixed Page).

DETAILED DESCRIPTION OF A PREFERRED EMBODIMENT

As described in the "BACKGROUND OF THE INVENTION", since the image forming apparatuses that can handle the XPS file have been provided in the market, opportunities for the user to utilize the XPS file have increased in recent years. However, since no application program for editing the XPS file has been introduced in the market so far, there has been a problem that the XPS file, which is once created, cannot be edited again by the user. Further, even if such the editing application program were provided for the user, the user should download the XPS file into the local environment by himself, as far as the conventional method is employed. In such the mode that the XPS file should be downloaded, there has arisen another problem that it is impossible for the plural operators to edit a single XPS file at a time from the plural sites.

Figure 13:
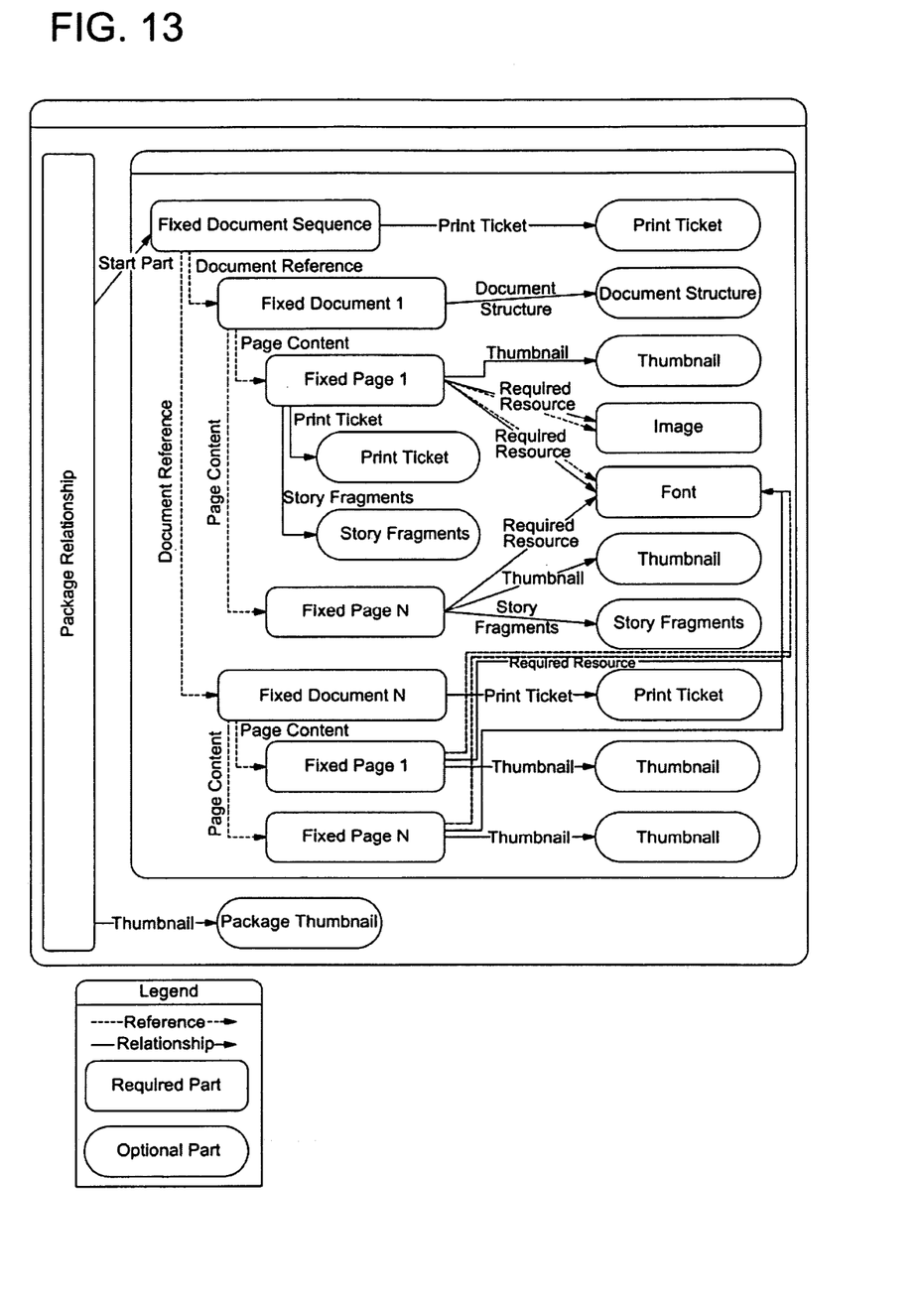
FIG. 13 shows a schematic diagram indicating a structure of a XPS file.

In this connection, as shown in FIG. 13, the XPS file is constituted by the plural parts indicated in Table 1, and each of the plural parts includes the "Elements" that constitute the "Document". Further, the structure of the XPS file is designated by describing the "Relationships" between the "Elements" with respect to every one of the "Package", the "Fixed Document Sequence", the "Fixed Document" and the "Fixed Page".

TABLE 1

XPS Document parts

| Name | Description |
| --- | --- |
| FixedDocumentSequence | Specifies a sequence of fixed documents. |
| FixedDocument | Specifies a sequence of fixed pages. |
| FixedPage | Contains the description of the contents of a page. |
| Font | Contains an OpenType or TrueType font. |
| JPEG image | References an image file. |
| PNG image | |
| TIFF image | |
| Windows Media Photo image | |
| Thumbnail | Contains a small JPEG or PNG image that represents the contents of the page or package. |
| PrintTicket | Provides settings to be used when printing the package. |
| DocumentStructure | Contains the document outline and document contents (story definitions) for the XPS Document. |
| StoryFragments | Contains document content structure for a fixed page. |
| SignatureDefinitions | Contains a list of digital signature spots and signature requirements. |

For instance, each of the "Fixed Document Sequence", the "Fixed Document", the "Fixed Page" and the "Relationship", mentioned in the above, is described in such a manner as shown in FIGS. 14 through 17. FIG. 14 shows an example of the description of the "Fixed Document Sequence", which describes that the objective file has two "Fixed Documents". FIG. 15 shows an example of the description of the "Fixed Document", which describes that the objective "Fixed Document" has three "Fixed Pages". FIG. 16 shows an example of the description of the "Fixed Page", which describes that the objective "Fixed Page" is constituted by two images. FIG. 17 shows an example of the description of the "Relationship", which describes that the objective "Fixed Page" is pertaining to both Element "Img_1.jpg" and Element "Img_2.jpg".

According to the present embodiment, recognizing the abovementioned structure of the XPS file, the present inventors make it possible to edit the XPS file by creating elements necessary for the editing operation of the XPS file and designating a relationship between the created elements. Further, considering the fact that, if the abovementioned editing function were provided in the host apparatus, the XPS file should be downloaded into the host apparatus and it would become impossible for the plural operators to edit the same XPS file at a same time, the present inventors come up with a method for utilizing a print job that is generally and widely employed in various kinds of image forming apparatuses or the like, in such a manner that file editing instruction information is attached to the print job, so as to make it possible to create the elements and to designate the "Relationship" based on the file editing instruction information attached to the print job.

Embodiment

Figure 1:
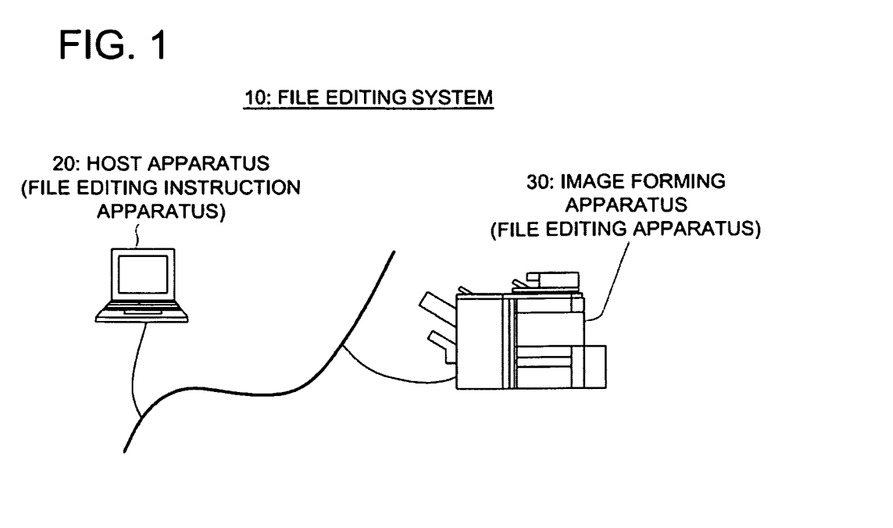
FIG. 1 shows a schematic diagram of a configuration of a file editing system embodied in the present invention.
Figure 2:
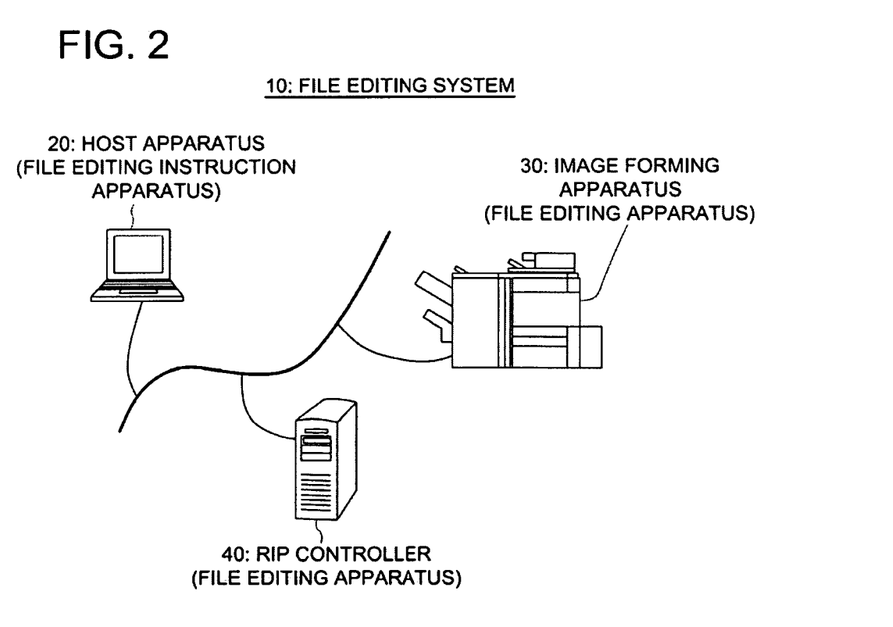
FIG. 2 shows a schematic diagram of another configuration of a file editing system embodied in the present invention.
Figure 3:
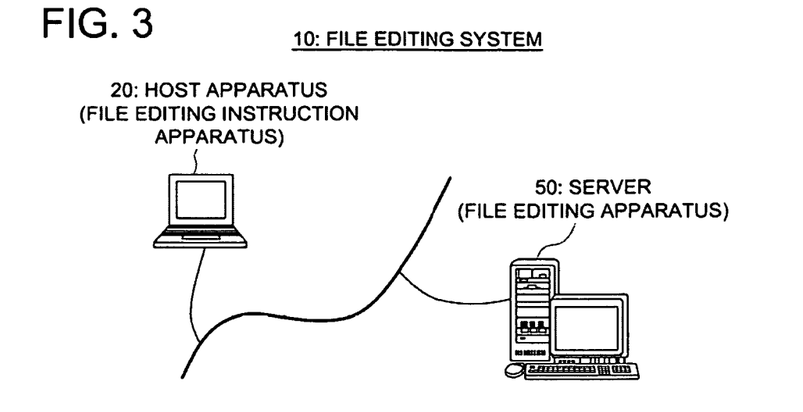
FIG. 3 shows a schematic diagram of still another configuration of a file editing system embodied in the present invention.
Figure 4:
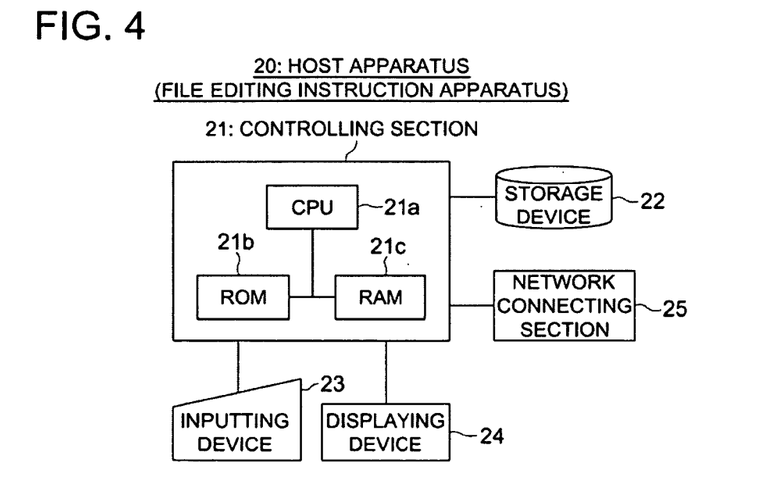
FIG. 4 shows a block diagram indicating a configuration of a file editing instruction apparatus (host apparatus) embodied in the present invention.
Figure 5:
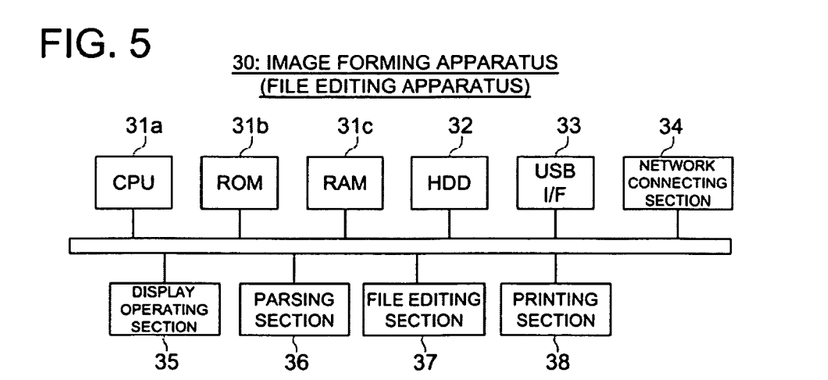
FIG. 5 shows a block diagram indicating a file editing apparatus (image forming apparatus) embodied in the present invention.
Figure 6:
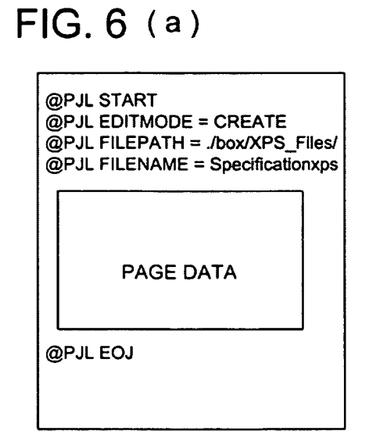
Figure 7:
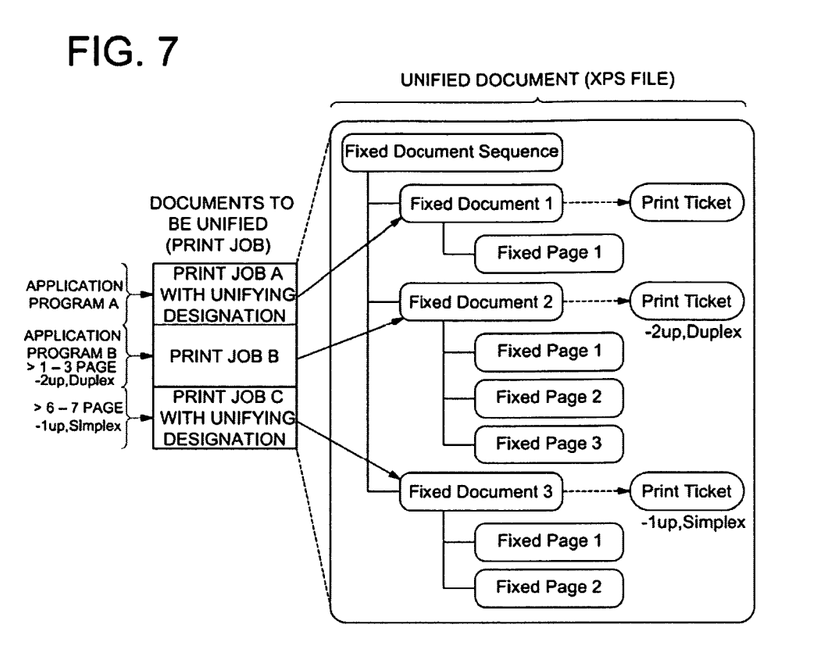
FIG. 7 shows a schematic diagram indicating a file editing method (document unification) embodied in the present invention.
Figure 8:
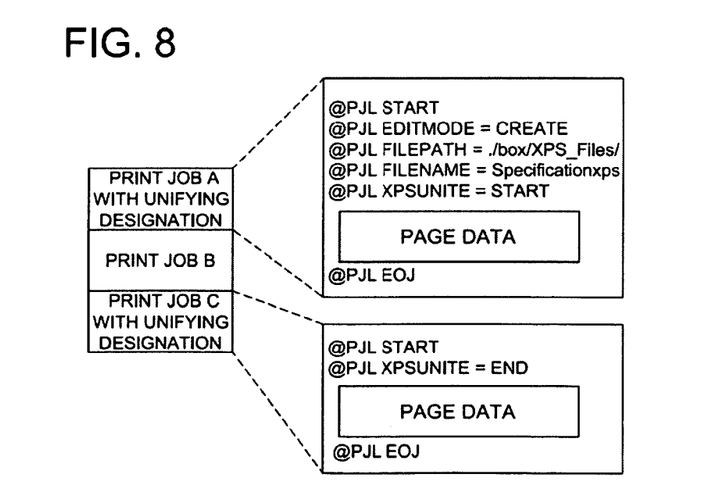
FIG. 8 shows an exemplified structure of a print job that designates document unification.

In order to describe the preferred embodiment of the present invention in detail, referring to FIG. 1 through FIG. 12, a file editing apparatus, a file editing method and a file editing program, embodied in the present invention, will be detailed in the following. FIGS. 1-3 schematic diagrams indicating various configurations of the file editing system, embodied in the present invention, FIG. 4 shows a block diagram indicating a configuration of the file editing instruction apparatus (host apparatus) and FIG. 5 shows a block diagram indicating the file editing apparatus (image forming apparatus). Further, FIGS. 6(a) through 6(d) show concrete examples of various print jobs, FIG. 7 shows a schematic diagram indicating the file editing method (document unification) embodied in the present invention and FIG. 8 shows an exemplified structure of the print job that designates the document unification. Still further, FIGS. 9 through 12 show flowcharts indicating concrete procedures of the file editing method embodied in the present invention.

As shown in FIG. 1, a file editing system 10, embodied in the present invention, is constituted by a host apparatus 20, such as a computer terminal device, etc., and an image forming apparatus 30, such as a printer, a digital compound apparatus (or a multi-functioned apparatus), etc., which are coupled to each other through a communication network, such as a LAN (Local Area Network), a WAN (Wide Area Network), etc. The host apparatus 20 serves as an apparatus for instructing an image forming apparatus to edit a file. For this purpose, the host apparatus 20 attaches the file editing instruction information to the print job concerned, and then, transmits the print job to the image forming apparatus 30. On the other hand, the image forming apparatus 30 serves as an apparatus for implementing the operations for editing the XPS file. Receiving the print job sent from the host apparatus 20, the image forming apparatus 30 parses the received print job to implement the XPS file concerned.

In this connection, hereinafter in the present specification, the term of "editing operation" includes various kinds of operations, such as a creation, a deletion, an insertion, an overwriting, etc., and is to edit at least one of plural parts constituting the XPS file concerned. Further, although the file editing system 10, embodied in the present invention and shown in FIG. 1, is constituted by the host apparatus 20 and the image forming apparatus 30, any kind of editing system is applicable as the file editing system 10, as far as the system includes the file editing instruction apparatus and the file editing apparatus. For instance, when a RIP (Raster Image Processor) controller 40 is coupled to the network as shown in FIG. 2, it is also applicable that the RIP controller 40 is made to serve as the file editing apparatus. Still further, when the XPS file is stored into a server 50 as shown in FIG. 3, it is also applicable that the server 50 is made to serve as the file editing apparatus. Hereinafter, the preferred embodiment will be detailed on the premise of the configuration shown in FIG. 1.

<Host Apparatus>

The host apparatus 20, serving as the file editing instruction apparatus, is provided with a controlling section 21, a storage device 22, an inputting device 23, a displaying device 24, a network connecting section 25, etc.

The controlling section 21 is constituted by a CPU (Central Processing Unit) 21a and memory devices, such as a ROM (Read Only Memory) 21b, a RAM (Random Access Memory) 21c, so that CPU 21a develops a program, stored in the ROM 21b, onto the RAM 21c to execute the program concerned. In the present embodiment, the controlling section 21 also serves as the file editing instruction section that attaches the file editing instruction information (hereinafter, referred to as a file editing identifier), which is described in a language being analyzable by the image forming apparatus 30 when creating the print job (hereinafter in the present embodiment, the PJT (Printer Job Language) is employed), to the created print job. In this connection, it is applicable that the print job to be employed in the present embodiment includes the objective document data, or is constituted only by the file editing identifier.

The storage device 22 is constituted by HDD (Hard Disc Drive), etc., so as to store various kinds of programs and data.

The inputting device 23 is constituted by a mouse, a keyboard, etc., so as to input various kinds of instructions for editing the XPS file, etc., therefrom.

The displaying device 24 is constituted by a LCD (Liquid Crystal Display), etc., so as to display a screen for editing the XPS file, etc.

The network connecting section 25 is constituted by a NIC (Network Interface Card), a modem, etc., so as to couple the host apparatus 20 to the image forming apparatus 30 through the communication network.

In this connection, although the personal computer is exemplified as the host apparatus 20 in the system configurations shown in FIG. 1 through FIG. 3, the scope of the present invention is not limited to the personal computer. Any kind of apparatus can be applicable as the host apparatus 20 embodied in the present invention, as far as the apparatus is capable of instructing the file editing apparatus so as to edit the XPS file.

<Image Forming Apparatus>

As shown in FIG. 5, the image forming apparatus 30, serving as a file editing apparatus, is constituted by a CPU 31a, a ROM 31b, a RAM 31c, a HDD (Hard Disc Drive) 32, a USB (Universal Serial Bus) interface section 33, a network connecting section 34, a display operating section 35, a parsing section 36, a file editing section 37, a printing section 38, etc., all of which are coupled to each other through a bus.

The ROM 31b stores various kinds of programs and data necessary for controlling the overall operations of the image forming apparatus 30 in it. The RAM 31c temporarily stores data to be employed for a controlling operation currently conducted by the CPU 31a and/or other data to be temporarily stored during the controlling operation in it. Accordingly, in conjunction with the ROM 31b and the RAM 31c, the CPU 31a serves as a controlling section to control the overall operations of the image forming apparatus 30.

The HDD 32 stores various kinds of XPS files to be editing objects, etc., therein.

The network connecting section 34 serves as an interface for coupling the image forming apparatus 30 to the communication network, such as a NIC, a modem, etc., so as to conduct operations for connecting the image forming apparatus 30 to the host apparatus 20 through the communication network.

The USB interface 33 serves as another interface for coupling various kinds of USB (Universal Serial Bus) devices, such as a USB memory, etc., to the image forming apparatus 30.

The display operating section 35 is constituted by a displaying section, such as a LCD (Liquid Crystal Display), etc., and an operating section, such as a touch panel, etc., so as to display icons, key-buttons and various kinds of settings necessary for the printing operation on the LCD or the like, and to output operational signals inputted from the touch panel or the like.

The parsing section 36 parses the print job acquired from the host apparatus 20 through the network connecting section 34, so as to read the file editing identifier attached to the print job concerned. print data.

Based on the file editing identifier read from the print job, the file editing section 37 creates elements necessary for editing the XPS file concerned, and then, implements the operations for editing the XPS file stored in the HDD 32 by designating the relationships between the created elements.

The printing section 38 creates bitmap data from the image data of the pages included in the XPS file concerned, and based on the created bitmap data, prints images of the pages according to the electro-photographic process. Concretely speaking, an exposure section irradiates a light (for instance, a laser beam) modulated according to the bitmap data onto a photoreceptor drum uniformly charged with electrostatic charge by a charging device, so as to form a latent image on the photoreceptor drum. Successively, a developing device makes toner adhere onto the latent image so as to develop a visible image, serving as a toner image, on the circumferential surface of the photoreceptor drum. Still successively, the developed toner image is transferred from the circumferential surface of the photoreceptor drum onto a paper medium through an intermediate transfer belt. Then, a fixing device applies heat and pressure onto the toner image transferred on the paper medium, so as to fix the toner image onto the paper medium.

In this connection, although the parsing section 36 and the file editing section 37 are configured separately from the controlling section constituted by the CPU 31a, the ROM 31b, the RAM 31c, etc., in the image forming apparatus 30 shown in FIG. 5, it is also applicable that, instead of the configuration shown in FIG. 5, a file editing program, to be executed by a computer to make the computer serve as the parsing section 36 and the file editing section 37, is provided in the image forming apparatus 30, so as to make the controlling section execute the file editing program.

The procedures for editing the XPS file by employing the file editing system 10 configured as abovementioned will be detailed in the following. To easily understand the preferred embodiment of the present invention, the explanations of the file editing identifier will be given at first.

The file editing identifier is defined as the file editing instruction information described in a language readable (analyzable) for a file editing apparatus, such as the image forming apparatus 30, etc., (for instance, the PJL). Concretely speaking, the file editing identifier is one of: the "EDIT-MODE" that designates the editing method of the XPS file; the "FILEPATH" that specifies the storage area of the XPS file being the currently editing object; the "FILENAME" that specifies the name of the XPS file being the currently editing object; the "TARGETDOC" that specifies the document number (Fixed Document No.) being the currently editing object; the "TARGETPAGE" that specifies the page number (Fixed Page No.) being the currently editing object; the "XPSUNITE" that instructs the document unification; etc.

Then, the single or plural file editing identifier(s), mentioned in the above, is/are attached to the print job.

FIG. 6(a), FIG. 6(b), FIG. 6(c) and FIG. 6(d) show various examples of the print jobs, to each of which the file editing identifiers are attached.

FIG. 6(a) shows an example of the print job when the XPS file is to be created. As shown in FIG. 6(a), the "EDIT-MODE", the "FILEPATH" and the "FILENAME" are established as the "CREATE", the "./box/XPS_Files/" and the "Specification.xps", respectively, and are attached to the page data. According to the above example, the file editing identifiers instruct the image forming apparatus 30 to store the page data into the "./box/XPS_Files/" with the filename of the "Specification.xps".

FIG. 6(b) shows an example of the print job when the XPS file is to be deleted. As shown in FIG. 6(b), the "EDIT-MODE", the "FILEPATH" and the "FILENAME" are established as the "DELETE", the "./box/XPS_Files/" and the "Specification.xps", respectively. According to the above example, the file editing identifiers instruct the image forming apparatus 30 to delete the XPS file stored in the "./box/XPS_Files/" and having the filename of the "Specification.xps".

FIG. 6(c) shows an example of the print job when the XPS file is to be edited. As shown in FIG. 6(c), the "EDITMODE", the "FILEPATH", the "FILENAME", the "TARGETDOC" and the "TARGETPAGE" are established as the "INSERT", the "./box/XPS_Files/", the "Specification.xps", the "1" and the "2", respectively. According to the above example, the file editing identifiers instruct the image forming apparatus 30 to insert the page data into the second Fixed Page included in the first Fixed Document of the XPS file, stored in the "./box/XPS_Files/" and having the filename of the "Specification.xps".

FIG. 6(d) shows an example of the print job when the XPS file is to be overwritten. As shown in FIG. 6(d), the "EDIT-MODE", the "FILEPATH", the "FILENAME", the "TARGETDOC" and the "TARGETPAGE" are established as the "OVERWRITE", the "./box/XPS_Files/", the "Specification.xps", the "1" and the "2", respectively, and are attached to the page data. According to the above example, the file editing identifiers instruct the image forming apparatus 30 to replace the data of the second Fixed Page included in the first Fixed Document of the XPS file, stored in the "./box/XPS_Files/" and having the filename of the "Specification.xps", with the page data concerned.

As mentioned in the above, by attaching the file editing identifier(s), written in the PJL, to the print job, it becomes possible for the apparatus to edit the XPS file easily and conveniently, as far as the apparatus is capable of parsing the PJL as the image forming apparatus 30. Further, since the XPS file can be structured by a plurality of Fixed Documents, it becomes possible to perform such a processing that unifies the plural documents into a single XPS file (Document Unification, so called) by correlating the page data sets, which are created by employing separate application programs, and the Fixed Documents with each other.

For instance, as shown in FIG. 7, when a page created by employing an application program A, other pages 1-3 included in a document created by employing an application program B and still other pages 6-7 included in the document created by employing the application program B are to be unified, the print jobs corresponding to the above pages are unified. Successively, as shown in FIG. 8, the "XPSUNITE=START", serving as the file editing identifier indicating the start of the unification processing, is attached to the print job assigned at a top-leading position (hereinafter, referred to as a print job A), while the "XPSUNITE=END", serving as the file editing identifier indicating the finalization of the unification processing, is attached to the print job assigned at a last-trailing position (hereinafter, referred to as a print job C). According to the above, it becomes possible not only to unify the documents created by employing separate application programs, respectively, into a single XPS file, but also to edit the XPS file easily, conveniently and freely.

Next, the concrete procedures of the file editing method embodied in the present invention will be detailed in the following.

Figure 9:
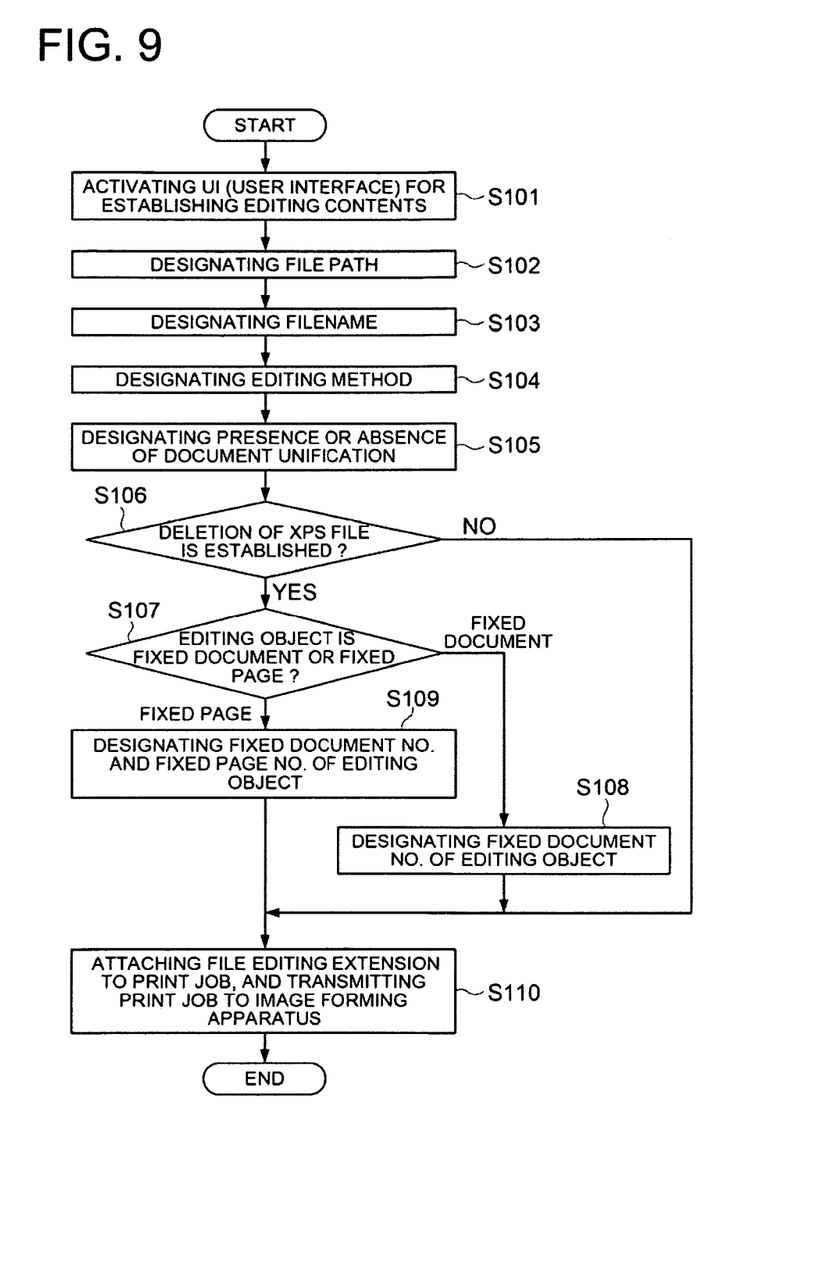
FIG. 9 shows a flowchart indicating concrete procedures for creating a print job, to be implemented in a file editing instruction apparatus (host apparatus) embodied in the present invention.

Initially, referring to the flowchart shown in FIG. 9, operations to be conducted by the file editing instruction apparatus (host apparatus 20) will be detailed in the following.

When the user performs predetermined inputting operations by operating the inputting device 23 of the host apparatus 20, the controlling section 21 activates a UI (User Interface) for establishing the editing contents of the XPS file (Step S101).

Successively, the user designates a file path, a filename and an editing method of the XPS file being currently editing object, and determines whether or not the document unification should be conducted (Step S102 through Step S105). In this connection, although it is assumed in the present embodiment that the XPS file being currently editing object is stored in advance in the file editing apparatus (the image forming apparatus 30 in this embodiment), it is also applicable that the system is so constituted that the concerned XPS file is stored in another arbitral apparatus (for instance, a server coupled to the network) to which the file editing apparatus is accessible.

Still successively, the user determines whether or not the deletion of the XPS file is established as the editing method (Step S106). When determining that the deletion of the XPS file is not established as the editing method (Step S106; No), the user makes the operational step jump to Step S110. On the other hand, when determining that the deletion of the XPS file is established as the editing method (Step S106; Yes: namely, the deletion, the insertion and/or the overwriting of the XPS file are/is designated), the user determining whether the currently editing object is the Fixed Document or the Fixed Page (Step S107).

Still successively, when determining that the currently editing object is the Fixed Document, the user designates the document number (Fixed Document No.) of the currently editing object (Step S108). On the other hand, when determining that the currently editing object is the Fixed Page, the user designates the document number (Fixed Document No.) and the page number (Fixed Page No.) of the currently editing object (Step S109).

Yet successively, the controlling section 21, serving as the file editing instruction section, attaches a file editing extension indicating one of various kinds of items, such as a file path, a filename, an editing method, presence or absence of a document unification, a document number and/or a page number of a currently editing object, etc., to the print job, and transmits the concerned print job to the image forming apparatus 30 (Step S110).

Next, referring to the flowcharts shown in FIG. 10 through FIG. 12, the operations to be conducted in the file editing apparatus (image forming apparatus 30) will be detailed in the following.

Figure 10:
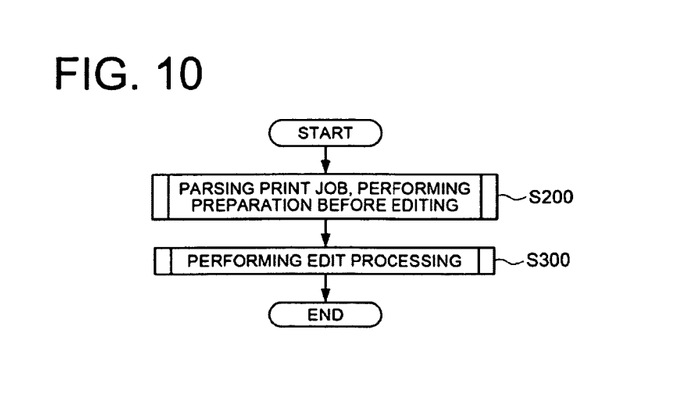
FIG. 10 shows a flowchart indicating concrete procedures for editing a file, to be implemented in a file editing apparatus (image forming apparatus) embodied in the present invention.

As shown in FIG. 10, in the file editing apparatus (image forming apparatus 30), the parsing section 36 parses the print job so as to read the file editing extension (Step S200), while the file editing section 37 performs the preparation working before editing the XPS file (such as the creation of the elements, the designation of the relationship between the elements, etc.) (Step S200), and the file editing section 37 conducts the edit processing of the XPS file based on the file editing extension (Step S300). Each of the above steps will be further detailed in the following.

<Parsing Print Job, Preparation Before Editing>

Figure 11:
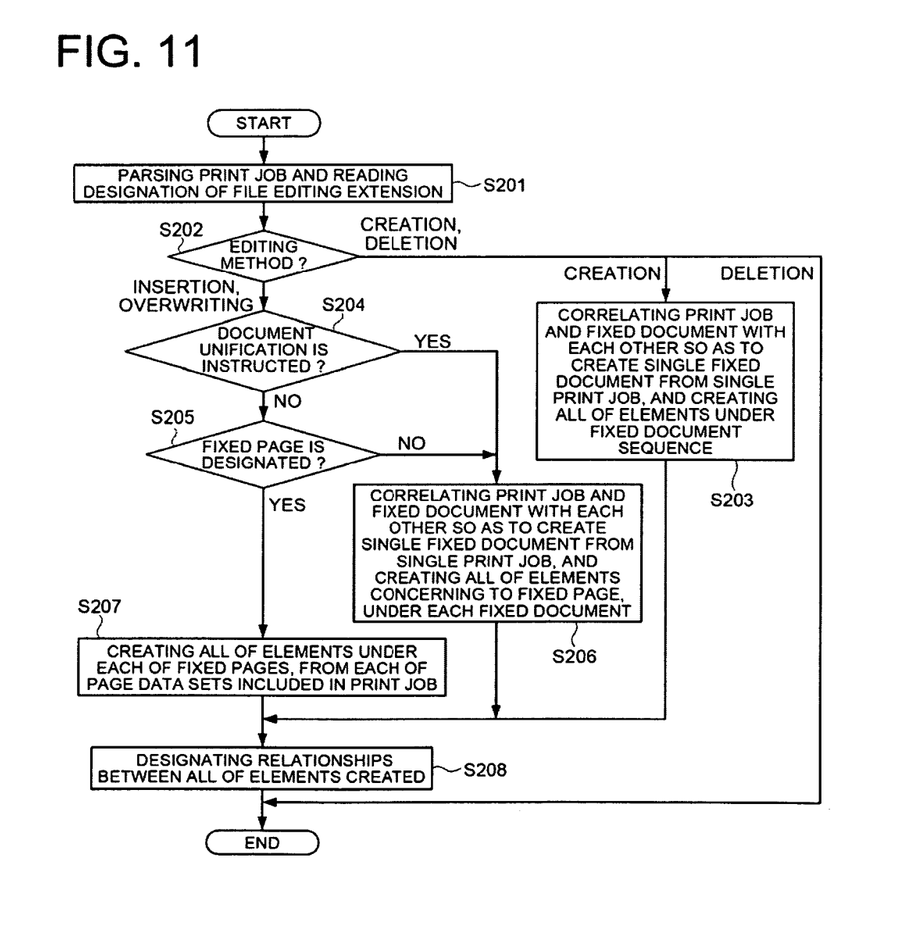
FIG. 11 shows a flowchart indicating detailed procedures for parsing a print job and for conducting editing preparation, to be implemented in a file editing apparatus (image forming apparatus) embodied in the present invention.

As shown in FIG. 11, when the image forming apparatus 30 receives the print job attached with the file editing extension from the file editing apparatus (host apparatus 20), the parsing section 36 parses the print job received and specifies the file editing extension to read its designation (Step S201).

Successively, the file editing section 37 determines the contents of the editing method based on the "EDITMODE" (Step S202). When determining that the editing method indicates the deletion (Step S202; Deletion), since it is not necessary to designate the relationship between the elements of the XPS file, the file editing section 37 finalizes the preparation before editing and makes the operational step jump to the "END". Further, when determining that the editing method indicates the creation (Step S202; Creation), the file editing section 37 correlates the print job and the Fixed Document with each other, so as to create all of the elements, such as the Fixed Document, the Fixed Page, the Thumbnail, the Image, the Font, etc., under the Fixed Document Sequence (Step S203).

Still successively, when determining that the editing method indicates the insertion or the overwriting (Step S202; Insertion, Overwriting), the file editing section 37 further determines whether or not the document unification is instructed, based on the "XPSUNITE" (Step S204). When determining that the document unification is not instructed (Step S204; No), the file editing section 37 still further determines whether or not the Fixed Page serving as the currently editing object is designated, based on the designation of the "TARGETPAGE" (Step S205).

Still successively, when determining that the document unification is instructed (Step S204; Yes), or when determining that the document unification is not instructed (Step S204; No) and the Fixed Page is not designated (Step S205; No), the file editing section 37 correlates the print job and the Fixed Document with each other, so as to create the all of the elements, such as the Fixed Page, the Thumbnail, the Image, the Font, etc., under the Fixed Document (Step S206).

On the other hand, when determining that the document unification is not instructed (Step S204; No) and the Fixed Page is designated (Step S205; Yes), the file editing section 37 correlates each of the page data sets included in the print job and each of the Fixed Pages with each other, so as to create the all of the elements, such as the Thumbnail, the Image, the Font, etc., under each of the Fixed Pages (Step S207).

Yet successively, the file editing section 37 designates the relationships between all of the elements created in the above (Step S209).

<Edit Processing>

Figures 12, 12A:
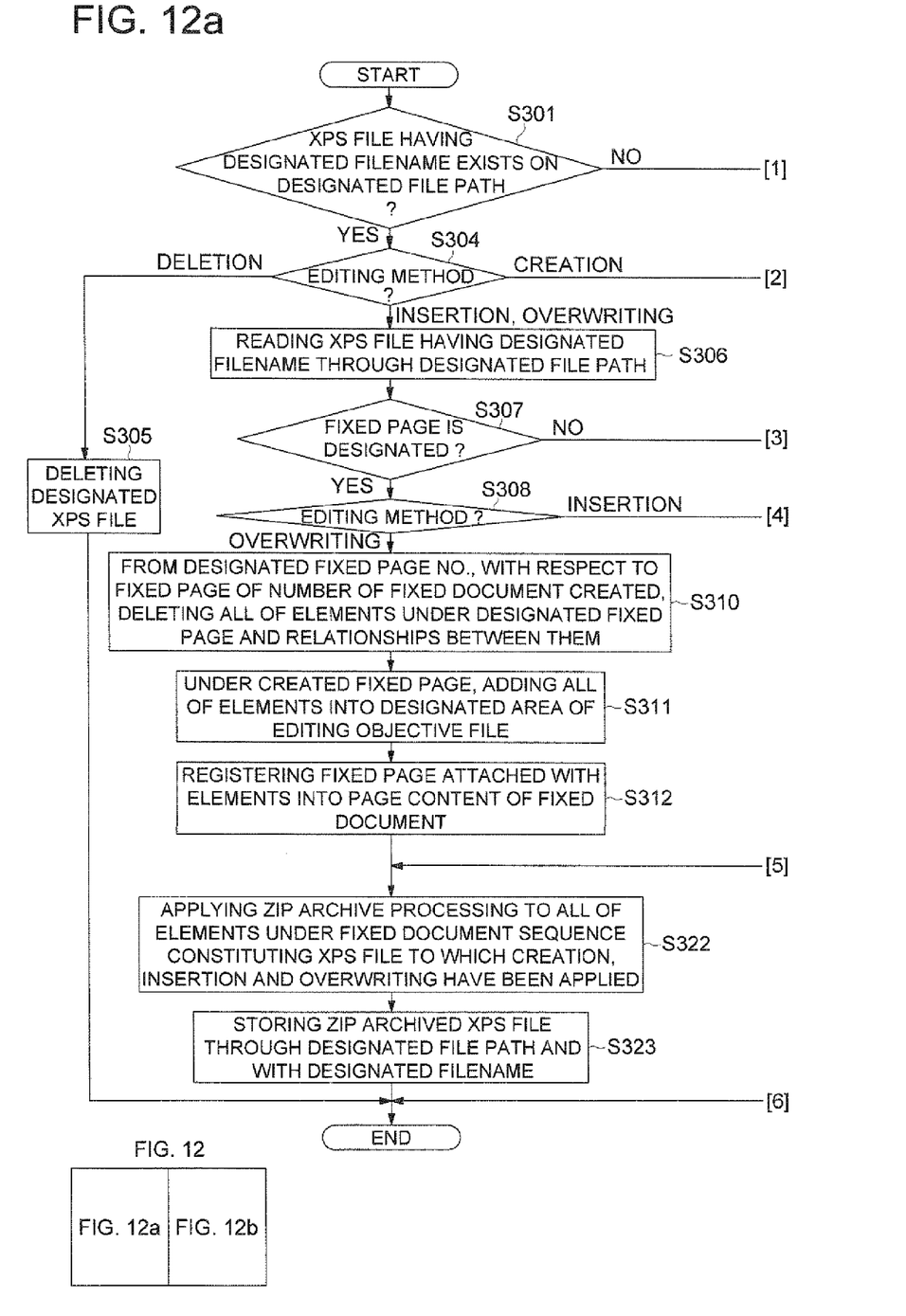
FIG. 12 shows a flowchart indicating detailed procedures for conducting edit processing, to be implemented in a file editing apparatus (image forming apparatus) embodied in the present invention.
Figure 12:
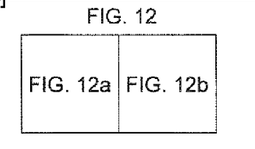
Figure 12B:
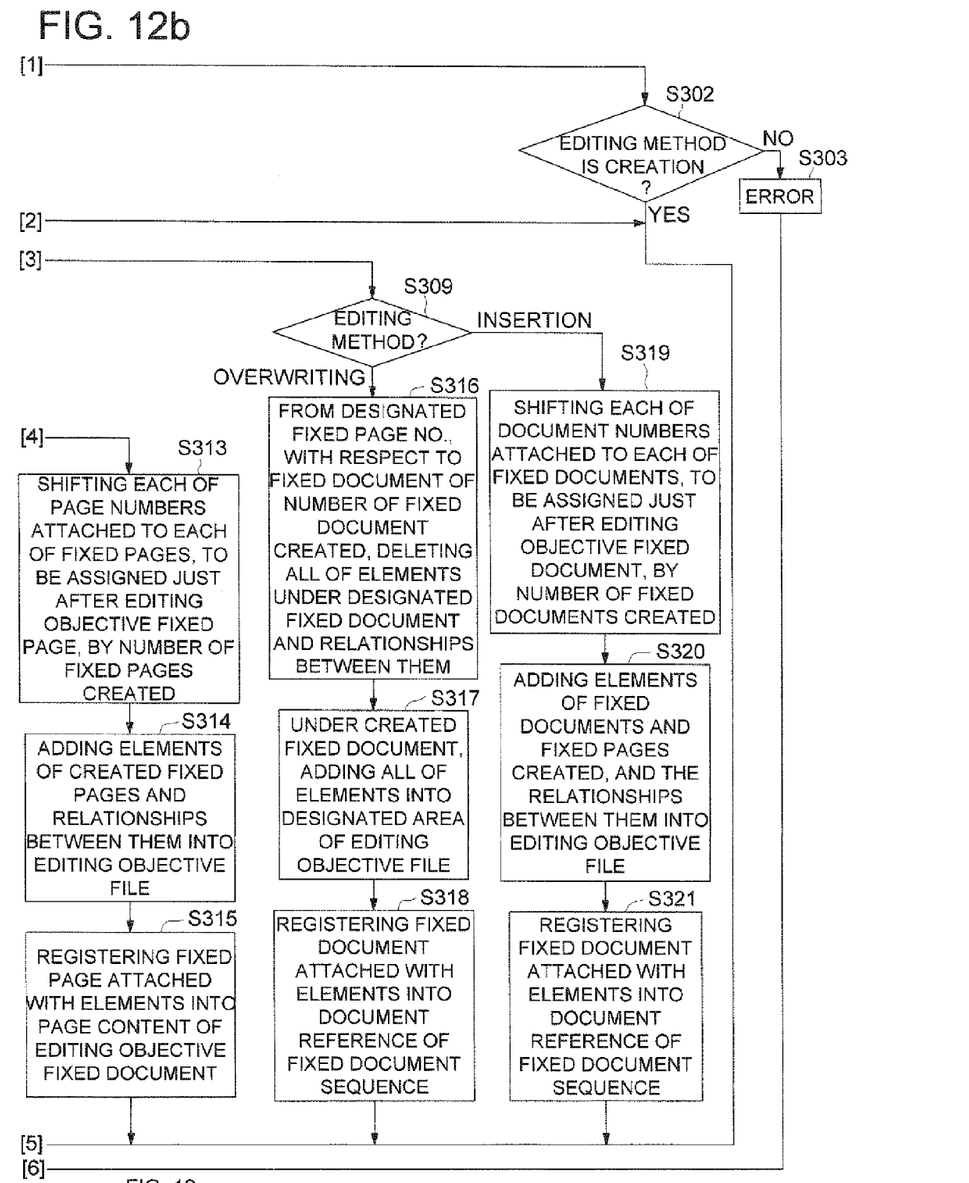

Initially, as shown in FIG. 12, based on the "FILEPATH" and the "FILENAME", the file editing section 37 determines whether or not the XPS file having the designated filename exists on the designated file path (Step S301). When determining that the concerned XPS file does not exist (Step S301; No), the file editing section 37 further determines whether or not the editing method is the creation, based on the "EDITMODE" (Step S302).

Successively, when determining that the editing method is the creation (Step S302; Yes), the file editing section 37 makes the operational step jump to Step S322. On the other hand, when determining that the editing method is not the creation (Step S302; No), since none of the XPS file, serving as an object of the deletion, the insertion and/or the overwriting, exist, the file editing section 37 issues an error message (Step S303) and finalizes the edit processing (END).

On the other hand, when determining that the concerned XPS file exists (Step S301; Yes), the file editing section 37 determines the content of the editing method, based on the "EDITMODE" (Step S304). When determining that the editing method indicates the creation (Step S304; Creation), the file editing section 37 makes the operational step jump to Step S322 as well as the aforementioned. Further, when determining that the editing method indicates the deletion (Step S304; Deletion), the file editing section 37 deletes the designated XPS file (Step S305) and finalizes the edit processing (END).

Further, when determining that the editing method indicates the insertion or the overwriting (Step S304; Insertion, Overwriting), the file editing section 37 read the XPS file having the designated filename from the designated file path, based on the "FILEPATH" and the "FILENAME" (Step S306).

Still successively, based on the "TARGETPAGE", the file editing section 37 determines whether or not the Fixed Page serving as the currently editing object is designated (Step S307). When determining that the Fixed Page is designated (Step S307; Yes), the file editing section 37 further determines whether the editing method indicates the insertion or the overwriting, based on the "EDITMODE" (Step S308). While, even when determining that the Fixed Page is not designated (Step S307; No), the file editing section 37 also determines whether the editing method indicates the insertion or the overwriting, based on the "EDITMODE" (Step S309). Then, corresponding to each of the four cases derived from the combinations of the determination whether or not the Fixed Page is designated and the other determination whether the editing method indicates the insertion or the overwriting, the file editing section 37 conducts each of the following processing.

At first, in the first case that Fixed Page is designated and the editing method indicates the overwriting, the file editing section 37 deletes all of the elements under the designated Fixed Page and the relationships between them (Step S310). Successively, the file editing section 37 adds the all of the new elements under the Fixed Page, which were created in the Step S207 aforementioned, into the designated area of the XPS file serving as the currently editing object (Step S311), and then, registers the Fixed Page attached with the new elements into the Page Content of the Fixed Document concerned (Step S312).

Further, in the second case that the Fixed Page is designated and the editing method indicates the insertion, the file editing section 37 shifts each of the numbers attached to each of Fixed Pages, to be assigned just after the Fixed Page serving as the currently editing object, by the number of Fixed Pages created (Step S313). Successively, the file editing section 37 adds the elements of the created Fixed Pages and the relationships between them to the XPS file serving as the currently editing object (Step S314), and then, registers the added Fixed Pages into the Page Content of the Fixed Document concerned (Step S315).

Still further, in the third case that the Fixed Page is not designated and the editing method indicates the overwriting, the file editing section 37 deletes all of the elements under the designated Fixed Document and the relationships between them (Step S316). Successively, the file editing section 37 adds the all of the new elements under the Fixed Document, which were created in the Step S206 aforementioned, into the designated area of the XPS file serving as the currently editing object (Step S317), and then, registers the Fixed Document attached with the new elements into the Document Content of the Fixed Document Sequence (Step S318).

Yet further, in the fourth case that the Fixed Page is not designated and the editing method indicates the insertion, the file editing section 37 shifts each of the document numbers attached to each of Fixed Documents, to be assigned just after the Fixed Document serving as the currently editing object, by the number of Fixed Documents created (Step S319). Successively, the file editing section 37 adds the elements of the Fixed Documents and the Fixed Pages created in the above, and the relationships between them into the designated area of the XPS file serving as the currently editing object (Step S320), and then, registers the added Fixed Document into the Document Content of the Fixed Document Sequence (Step S321).

Still successively, the file editing section 37 applies the ZIP archive processing (serving as the unification and compression processing) to all of the elements under the Fixed Document Sequence constituting the XPS file to which various kinds of edit processing, such as the creation, the insertion and the overwriting, have been applied as the currently editing object (Step S322).

Yet successively, the file editing section 37 stores the ZIP archived XPS file, acquired in the above, through the designated file path and with the designated filename (Step S323), and then, finalizes the consecutive operations of the edit processing (END).

As described in the foregoing, according to the processing procedures indicated in the flowcharts shown in FIG. 11 and FIG. 12, it becomes possible to conduct the creation, the deletion, the insertion and the overwriting of the XPS file, based on the file editing extension(s) attached to the print job concerned.

In this connection, although the XPS file is exemplified as an object to be currently edited in the embodiment described in the foregoing, the scope of the present invention is not limited to the above. The present invention is applicable for any arbitral kind of document file, as far as the document file is editable on the basis of the file editing instruction information described in a language being analyzable for the file editing apparatus concerned.

The present invention is available for a file editing apparatus, such as an image forming apparatus, a RIP controller, a server, each of which is capable of parsing a print job, a file editing method to be employed by the file editing apparatus, and a file editing program to be executed in the file editing apparatus concerned.

According to the present invention, for instance, the following effect can be attained.

A file editing apparatus, such as an image forming apparatus, etc., that is capable of parsing a print job, is provided with a parsing section and a file editing section, each of which is configured as either hardware or software. In the file editing apparatus, the parsing section parses the print job to read the file editing instruction information attached to the print job concerned, while the file editing section automatically implements the operations for editing the XPS file, based on the file editing instruction information read from the print job concerned. By making use of the print job in the manner as mentioned in the above, it becomes possible to edit the XPS file, irrespective of the OS (Operating System) or the environment of the application program currently executed. Further, since it is not necessary to move the XPS file, serving as a currently editing object, from the file editing apparatus to anther apparatus located at the local environment (for instance, a host apparatus, etc.), it becomes possible for plural users, respectively located at different sites, to issue instructions for editing the same XPS file from the different sites at a time.

While the preferred embodiments of the present invention have been described using specific term, such description is for illustrative purpose only, and it is to be understood that changes and variations may be made without departing from the spirit and scope of the appended claims.

What is claimed is:

1. A non-transitory computer readable storage medium storing a computer executable program to be executed in an image forming apparatus for editing an XPS file, the image forming apparatus being configured to receive from a host apparatus a print job and file editing instruction information attached to the print job, the file editing instruction information including first information for specifying the XPS file and second information for designating a method for editing the XPS file, the program being executable to cause the image forming apparatus to execute steps comprising:
   parsing the print job, received from the host apparatus, so as to read out the first information for specifying the XPS file and the second information for designating the method for editing the XPS file, both included in the file editing instruction information attached to the print job;
   specifying the XPS file based on the first information read from the print job;
   decompressing the XPS file to create a decompressed XPS file from the XPS file;
   editing the decompressed XPS file based on the second information read from the print job; and
   compressing the edited decompressed XPS file so as to create an edited XPS file that is different from the XPS file received from the host apparatus.

2. The non-transitory computer readable storage medium of claim 1, wherein the program causes the image forming apparatus to perform:
   a first function that includes: correlating the print job with Fixed Document or Fixed Page of the XPS file; creating first elements being necessary for editing the XPS file; and designating a single first relationship or plural first relationships between the first elements created, when conducting a creation, an insertion or an overwriting of a document,
   a second function that includes: shifting a number of the Fixed Document or the Fixed Page; adding all of the first elements created under the Fixed Document or the Fixed Page, thereto; and registering the Fixed Document or the Fixed Page added with the first elements into a predetermined area, when conducting the insertion of the document concerned, and
   a third function that includes: deleting all of second elements currently set under the Fixed Document or the Fixed Page and second relationships between the second elements; adding all of the first elements created under the Fixed Document or the Fixed Page, thereto; and registering the Fixed Document or the Fixed Page added with the first elements into the predetermined area, when conducting the overwriting of the document concerned.

3. The non-transitory computer readable storage medium of claim 2,
   wherein, when conducting the creation of the document, the first function further includes: correlating the print job with the Fixed Document of the XPS file; creating all of third elements to be set under Fixed Document Sequence; and designating third relationships between the third elements, and wherein, when conducting the insertion or the overwriting of the document and when the Fixed Page is not designated, the first function further includes: correlating the print job with the Fixed Document of the XPS file; creating all of fourth elements to be set under Fixed Document; and designating fourth relationships between the fourth elements created, and wherein, when conducting the insertion or the overwriting of the document and when the Fixed Page is designated, the first function further includes: correlating the print job with the Fixed Page of the XPS file; creating all of fifth elements to be set under Fixed Page; and designating fifth relationships between the fifth elements created.

4. The non-transitory computer readable storage medium of claim 2, wherein, when conducting the insertion of the document and when the Fixed Page is not designated, the third function further includes: shifting each of document numbers of Fixed Documents, assigned just after other Fixed Documents to be inserted, by a number of the other Fixed Documents; adding all of sixth elements to be set under the other Fixed Documents, thereto; and registering the other Fixed Documents added with the sixth elements into the predetermined area, and wherein, when conducting the overwriting of the document and when the Fixed Page is not designated, the third function further includes: deleting all of the second elements currently set under the Fixed Document and second relationships between the second elements; adding all of the first elements created under the Fixed Document, thereto; and registering the Fixed Document added with the first elements into the predetermined area, and wherein, when conducting the insertion of the document and when the Fixed Page is designated, the third function further includes: shifting each of page numbers of Fixed Pages, assigned just after other Fixed Pages to be inserted, by a number of the other Fixed Pages; adding all of seventh elements to be set under the other Fixed Pages, thereto; and registering the other Fixed Pages added with the seventh elements into the predetermined area, and wherein, when conducting the overwriting of the document and when the Fixed Page is designated, the third function further includes: deleting all of the second elements currently set under the Fixed Page and the second relationships between the second elements; adding all of the first elements created under the Fixed Page, thereto; and registering the Fixed Page added with the first elements into the predetermined area.

5. The non-transitory computer readable storage medium of claim 1, wherein the file editing instruction information is described in a Printer Job Language.

6. An image forming apparatus that is connectable to a computer and receives from the computer a print job attached with file editing instruction information, the file editing instruction information including first information for specifying an XPS file and second information for designating a method for editing the XPS file, the image forming apparatus comprising:

a processor adapted to receive the print job attached with the file editing instruction information and transmitted by the computer; and a storage section adapted to store the XPS file therein, wherein the processor is adapted to perform:

parsing the print job, received from the computer, so as to read out the first information for specifying the XPS file and the second information for designating the method for editing the XPS file, both included in the file editing instruction information attached to the print job;

specifying the XPS file, stored in the storage section, based on the first information read from the print job;

decompressing the XPS file to create a decompressed XPS file from the XPS file;

editing the decompressed XPS file based on the second information read from the print job; and compressing the edited decompressed XPS file so as to newly create an edited XPS file that is different from the XPS file received from the computer.

7. The image forming apparatus of claim 6, wherein the processor is adapted to further perform:

a first function comprising: correlating the print job with Fixed Document or Fixed Page of the XPS file; creating first elements being necessary for editing the XPS file; and, when conducting a creation, designating a single first relationship or plural first relationships between the first elements created for an insertion or an overwriting of a document, a second function comprising: shifting a number of the Fixed Document or the Fixed Page; adding all of the first elements created under the Fixed Document or the Fixed Page thereto; and registering the Fixed Document or the Fixed Page added with the first elements into a predetermined area, when conducting the insertion of the document concerned, and a third function comprising: deleting all of second elements currently set under the Fixed Document or the Fixed Page and second relationships between the second elements; adding all of the first elements created under the Fixed Document or the Fixed Page thereto; and registering the Fixed Document or the Fixed Page added with the first elements into the predetermined area, when conducting the overwriting of the document concerned.

8. The image forming apparatus of claim 7, wherein when conducting the creation of the document, the first function further comprises: correlating the print job with the Fixed Document of the XPS file; creating all of third elements to be set under Fixed Document Sequence; and designating third relationships between the third elements, when conducting the insertion or the overwriting of the document and when the Fixed Page is not designated, the first function further comprises: correlating the print job with the Fixed Document of the XPS file; creating all of fourth elements to be set under Fixed Document; and designating fourth relationships between the fourth elements created, and when conducting the insertion or the overwriting of the document and when the Fixed Page is designated, the first function further comprise: correlating the print job with the Fixed Page of the XPS file; creating all of fifth elements to be set under Fixed Page; and designating fifth relationships between the fifth elements created.

9. The image forming apparatus of claim 7, wherein when conducting the insertion of the document and when the Fixed Page is not designated, the third function further comprises: shifting each of document numbers of Fixed Documents, assigned just after other Fixed Documents to be inserted, by a number of the other Fixed Documents; adding all of sixth elements to be set under the other Fixed Documents thereto; and registering the other Fixed Documents added with the sixth elements into the predetermined area, when conducting the overwriting of the document and when the Fixed Page is not designated, the third function further comprises: deleting all of the second elements currently set under the Fixed Document and second relationships between the second elements; adding all of the first elements created under the Fixed Document thereto; and registering the Fixed Document added with the first elements into the predetermined area, when conducting the insertion of the document and when the Fixed Page is designated, the third function further comprises: shifting each of page numbers of Fixed Pages, assigned just after other Fixed Pages to be inserted, by a number of the other Fixed Pages; adding all of seventh elements to be set under the other Fixed Pages thereto; and registering the other Fixed Pages added with the seventh elements into the predetermined area, and when conducting the overwriting of the document and when the Fixed Page is designated, the third function further includes: deleting all of the second elements currently set under the Fixed Page and the second relationships between the second elements; adding all of the first elements created under the Fixed Page thereto; and registering the Fixed Page added with the first elements into the predetermined area.

10. The image forming apparatus of claim 6, wherein the file editing instruction information is described in a Printer Job Language.

* * * * *